(12) United States Patent
Ballard

(10) Patent No.: US 9,058,844 B2
(45) Date of Patent: Jun. 16, 2015

(54) ACCESS TO MIGRATED TAPES

(71) Applicant: Hewlett-Packard Development Company, L.P., Fort Collins, CO (US)

(72) Inventor: Curtis C. Ballard, Eaton, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 321 days.

(21) Appl. No.: 13/623,609

(22) Filed: Sep. 20, 2012

(65) Prior Publication Data

US 2014/0078609 A1    Mar. 20, 2014

(51) Int. Cl.
- G11B 20/12 (2006.01)
- G11B 5/86 (2006.01)
- G11B 5/008 (2006.01)
- G11B 20/10 (2006.01)
- G11B 5/09 (2006.01)

(52) U.S. Cl.
CPC .. G11B 20/1262 (2013.01); G11B 2020/10833 (2013.01); G11B 5/86 (2013.01); G11B 5/00821 (2013.01); G11B 5/09 (2013.01); G11B 2220/41 (2013.01); G11B 2220/93 (2013.01)

(58) Field of Classification Search
None
See application file for complete search history.

(56) References Cited

U.S. PATENT DOCUMENTS

| | | | |
|---|---|---|---|
| 5,414,570 A * | 5/1995 | Fry et al. | 360/48 |
| 5,485,321 A * | 1/1996 | Leonhardt et al. | 360/48 |
| 5,774,287 A * | 6/1998 | Leonhardt et al. | 360/48 |
| 6,067,481 A * | 5/2000 | Saliba et al. | 700/214 |
| 7,284,017 B2 | 10/2007 | Baune | |
| 7,509,355 B2 | 3/2009 | Hanes et al. | |
| 8,139,304 B2 | 3/2012 | Cideciyan et al. | |
| 8,145,861 B1 * | 3/2012 | Manthey et al. | 711/162 |
| 8,285,762 B2 * | 10/2012 | Cannon et al. | 707/825 |
| 8,453,010 B2 * | 5/2013 | Thompson et al. | 714/6.2 |
| 8,458,391 B2 * | 6/2013 | Itoh | 360/71 |
| 8,553,344 B2 * | 10/2013 | Thompson et al. | 360/15 |
| 8,719,518 B2 * | 5/2014 | Tomii | 711/154 |
| 2006/0277225 A1 * | 12/2006 | Mark et al. | 707/201 |
| 2008/0010325 A1 * | 1/2008 | Yamakawa | 707/204 |
| 2008/0019226 A1 * | 1/2008 | Sasage et al. | 369/30.44 |
| 2011/0211273 A1 | 9/2011 | Thompson | |
| 2012/0127606 A1 * | 5/2012 | Starr | 360/92.1 |

OTHER PUBLICATIONS

Spectra, Migrating Data Across Tape Technologies—AIT to LTO, Spectra Logic, 2012, 1 page.

* cited by examiner

*Primary Examiner* — Wayne Young
*Assistant Examiner* — James L Habermehl
(74) *Attorney, Agent, or Firm* — Dicke, Billig & Czaja, PLLC

(57) ABSTRACT

A system including a tape library and a tape drive. The tape library identifies which tapes in the tape library include one or more migrated tapes. The tape drive provides access to each migrated tape of the one or more migrated tapes by an original application.

20 Claims, 7 Drawing Sheets

ACCESS TO MIGRATED TAPES

BACKGROUND

Magnetic tape data storage uses digital recordings on magnetic tape to store digital information. Often, magnetic tape is used for offline, archival data storage, where magnetic tape is the primary copy of stored data. Generally, magnetic tape is cost effective and has long archival stability, such as thirty years or more.

Typically, magnetic tape is packaged in tape cartridges or tape cassettes. Tape drives write data to and read data from these tapes. Autoloaders and tape libraries store the tapes and automate tape handling.

DETAILED DESCRIPTION

Manufacturers continue improving tape storage formats and tape drives to more densely store data and improve data access times. These improvements are included in newer generations of the tape storage formats and tape drives. Sometimes, newer generation tape drives can write and read tapes that are one or two generations older. However, one or two generations may go back less than ten years.

Different methods have been used to manage older generation tapes. In one method, older tape drives are kept and maintained for writing and reading the older generation tapes. However, this consumes valuable tape library storage and data transfer device locations. In another method, an older generation tape is manually migrated to a single newer generation tape with loss of capacity on the newer generation tape. In another method, data from an older generation tape is loaded into a compatible application and combined with other data before being stored on a newer generation tape, which is a time consuming and expensive process.

Linear tape-open (LTO) is a magnetic tape data storage technology developed as an open standards alternative to proprietary magnetic tape formats. LTO media has an advertised thirty year shelf life. LTO tape drives can read back two generations, so tapes older than two generations are not able to be read by the latest, highest capacity and performance tape drive. Customers using LTO media for archival purposes use old tape drives for reading and writing the older generation tapes, which uses valuable library storage and data transfer locations, resulting in lost capacity.

Each new generation of LTO tapes and tape drives has more storage capacity and faster read/write access times than the previous generation. Also, a partitioning capability is included in LTO tapes and tape drives newer than LTO-4 tapes and tape drives.

Figure 1:
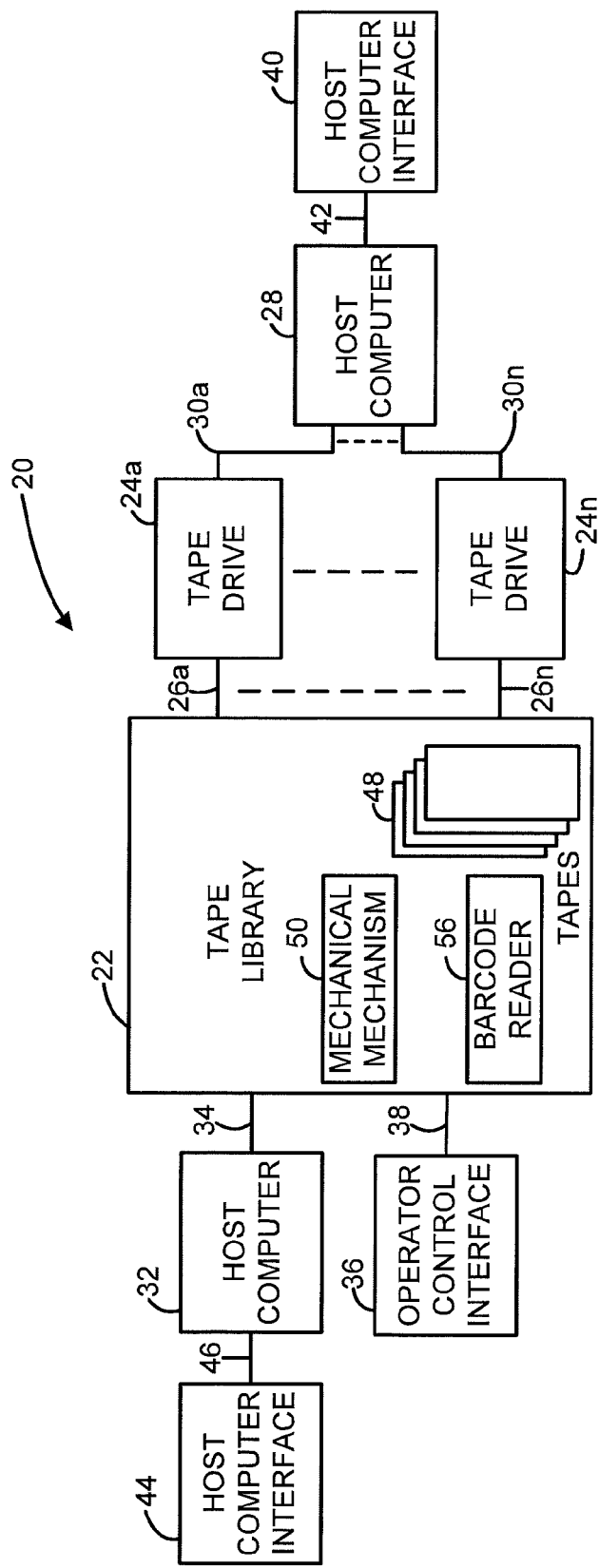
FIG. 1 is a diagram illustrating one example of a system that transfers older generation tapes to one or more partitions in a newer generation tape and provides access to each of the migrated older generation tapes by one or more original applications.

FIG. 1 is a diagram illustrating one example of a system 20 that transfers older generation tapes to one or more locations in a newer generation tape and provides access to each of the migrated older generation tapes by one or more original applications. Each newer generation tape that includes migrated older generation tapes is identified and each migrated older generation tape is reported as an independently selectable tape. Migrated older generation tapes that are selected can be accessed by a native or original application, such as the application that created the older generation tape.

System 20 includes a tape library 22 communicatively coupled to tape drives 24a-24n via communication channels 26a-26n, respectively. Each of the tape drives 24a-24n is communicatively coupled to a host computer 28 via communication channels 30a-30n, respectively. Also, tape library 22 is communicatively coupled to a host computer 32 via communications channel 34 and to an operator control interface 36 via communications channel 38. Host computer 28 is communicatively coupled to a host computer interface 40 via communications channel 42, and host computer 32 is communicatively coupled to a host computer interface 44 via communications channel 46. In one example, host computer 28 is communicatively coupled to host computer 32. In one example, host computer 28 and host computer 32 are the same host computer. In one example, host computer interface 40 is communicatively coupled to host computer interface 44. In one example, host computer interface 40 and host computer interface 44 are the same host computer interface.

Tape library 22 contains tapes 48 and a mechanical mechanism 50 for inserting each of the tapes 48 into one or more of the tape drives 24a-24n. Each of the tape drives 24a-24n reads and writes each of the inserted tapes 48 via read and write heads in the tape drive, scanning the magnetic media in the tape and transmitting data to and from host computer 28 and/or tape library 22.

Figure 2:
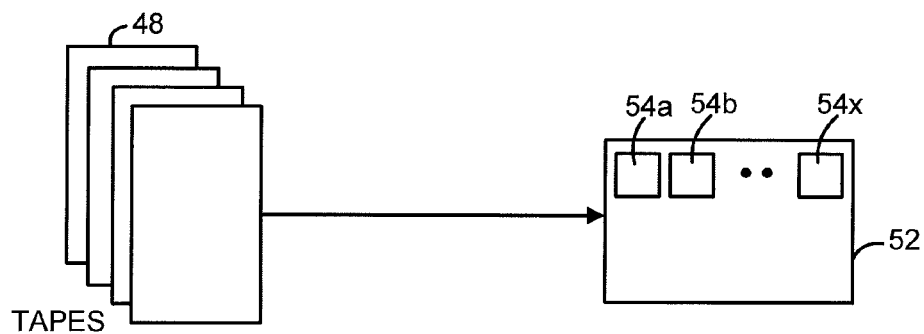
FIG. 2 is a diagram illustrating one example of a newer generation tape that includes multiple migrated older generation tapes.

The tapes 48 include older generation tapes and newer generation tapes that have more capacity and faster access times than the older generation tapes. FIG. 2 is a diagram illustrating one example of a newer generation tape 52 from the tapes 48. Newer generation tape 52 includes multiple migrated older generation tapes 54a-54x.

Tape library 22 identifies each of the tapes 48, such as newer generation tape 52, that includes one or more migrated older generation tapes, such as migrated older generation tapes 54a-54x. Also, tape library 22 identifies and displays each of the migrated older generation tapes as an independently selectable tape over one or more of host computer interface 40, host computer interface 44, and operator control interface 36. In one example, to identify each of the migrated older generation tapes, tape library 22 indicates an original barcode for each of the migrated older generational tapes.

Each of the tapes 48 that includes one or more migrated older generation tapes includes one or more identifiers that identify the tape as a multi-volume tape, i.e., a newer generation tape that includes one or more migrated older generation tapes. In one example, one or more of the multi-volume tapes in the tapes 48 has a barcode that identifies the tape as a multi-volume tape. In one example, the barcode is a single new barcode. In one example, the barcode is a combination of the original barcodes of the migrated older generation tapes in the multi-volume tape.

In one example, one or more of the multi-volume tapes in the tapes 48 includes identification in the magnetic tape and/or in a memory chip in the tape, where the memory chip is one example of a non-magnetic tape storage device. In another example, one or more of the multi-volume tapes in the tapes 48 includes radio frequency identification (RFID) tags, where an RFID tag is one example of a non-magnetic tape storage device. In other examples, one or more of the multi-volume tapes in the tapes 48 includes special physical and/or other electronic mechanisms that identify the tape as a multi-volume tape.

In one example, tape library 22 includes a barcode reader or scanner 56 that reads barcodes on the tapes 48 loaded into tape library 22. Tape library 22 identifies multi-volume tapes via the barcode. In another example, tape library 22 loads one of the tapes 48 into one of the tape drives 24a-24n, which reads the loaded tape and reports back to tape library 22 whether the loaded tape is a multi-volume tape. In another example, tape library 22 includes an RFID tag reader that reads RFID tags on the tapes 48 and reports back to tape library 22 whether a tape is a multi-volume tape. In other examples, tape library 22 includes different mechanisms for identifying which of the tapes 48 is a multi-volume tape.

Tape library 22 and host computer 28 provide access to each migrated older generation tape in a multi-volume tape via an original application of the migrated tape. A user requests or selects one of the migrated older generation tapes in the multi-volume tape via host computer interface 40 and/or host computer interface 44 and/or operator control interface 36. Tape library 22 receives the request and loads the multi-volume tape that includes the selected migrated older generation tape into one of the tape drives 24a-24n, such as tape drive 24a. Tape library 22 notifies tape drive 24a that it is loading a multi-volume tape and indicates the selected migrated older generation tape to tape drive 24a.

Tape drive 24a reads the multi-volume tape and determines the partition in the multi-volume tape, which is one example of a location in the multi-volume tape, that includes the selected migrated older generation tape. Tape drive 24a positions the multi-volume tape to the determined partition to access the selected migrated older generation tape and provides an indication that the selected migrated older generation tape is available for access by the original application. In one example, tape drive 24a scans non-user accessible data in the multi-volume tape to determine which partition in the multi-volume tape includes the selected migrated older generation tape. In one example, tape drive 24a indicates that it is a different generation tape drive than it is, for access by the original application. In one example, tape drive 24a indicates that the multi-volume tape is a different generation tape than it is, for access by the original application. In one example, tape drive 24a indicates that the generation of the tape drive and the generation of the tape is the same as the generation of the selected migrated older generation tape.

Tape library 22 and host computer 28 receive the indication that the selected migrated older generation tape is available for access by the original application. The original application is in host computer 28 or host computer 32. If the original application is in host computer 32 tape library 22 notifies the original application that the selected older generation tape is available via communications channel 34. The original application accesses the selected older generation tape via tape drive 24a.

In system 20, users have access to each of the migrated older generation tapes as if it is the original older generation tape loaded into an original older generation tape drive. Users can use original applications to access the migrated older generation tapes without changing the original application. The original application looks for an original older generation tape and virtually finds it in the newer generation tape in tape library 22.

Figure 3:
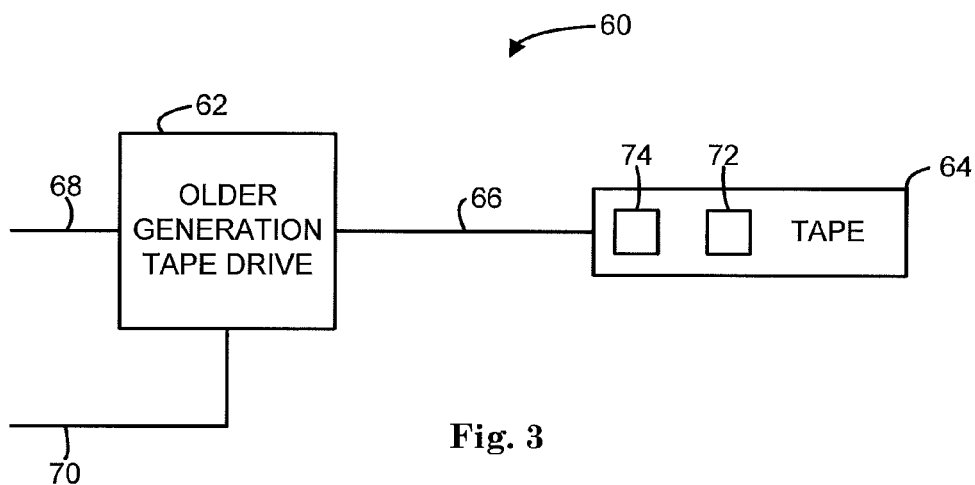
FIG. 3 is a diagram illustrating one example of a system that includes an older generation tape drive that reads and writes an older generation tape.

FIG. 3 is a diagram illustrating one example of a system 60 that includes an older generation tape drive 62 that reads and writes an older generation tape 64 via a communications channel 66, such as a read/write head. In one example, older generation tape 64 is an LTO tape cartridge.

Older generation tape drive 62 includes migration software for migrating data from older generation tapes to a newer generation tape. Older generation tape drive 62 receives commands at 68 via a tape library, such as tape library 22, and/or older generation tape drive 62 receives commands at 70 via a host computer and host computer interface, such as host computer 28 and host computer interface 40. These commands configure older generation tape drive 62 for migrating data, including user accessible data and non-user accessible data, from older generation tapes to a newer generation tape. Older generation tape drive 62 is configured to read non-user accessible data, including data from one or more of a memory chip 72 and non-user accessible data from a portion of the magnetic tape in older generation tape 64. In one example, a tape library, such as tape library 22, reads an original barcode 74 on older generation tape 64 and provides the original barcode 74 to older generation tape drive 62.

In another example, a newer generation tape drive is configured to read older generation tapes and includes the migration software for migrating data from the older generation tapes to a newer generation tape. This newer generation tape drive receives commands that configure it for migrating data, including user accessible data and non-user accessible data, from the older generation tapes to the newer generation tape. The newer generation tape drive is configured to read non-user accessible data, including data from one or more of a memory chip and non-user accessible data from a portion of the magnetic tape in an older generation tape.

Figure 4:
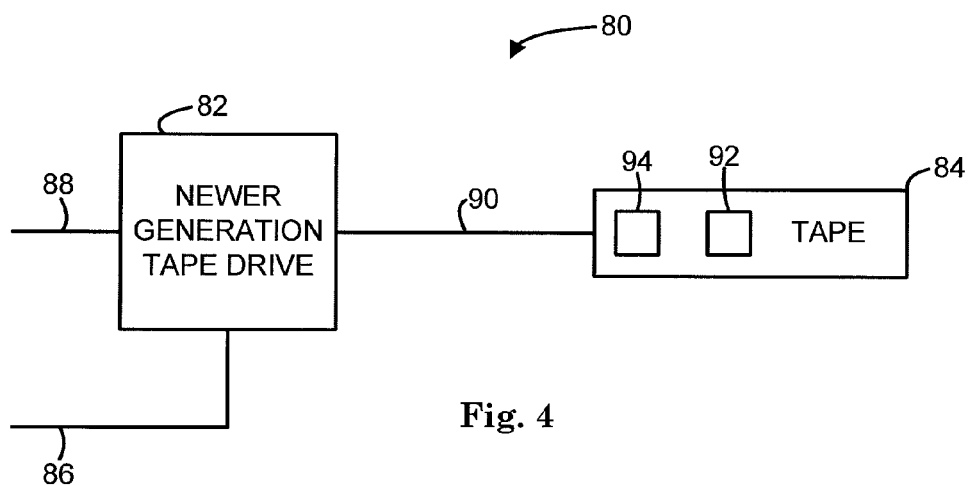
FIG. 4 is a diagram illustrating one example of a system that includes a tape drive that receives data from older generation tapes and stores the received data into a newer generation tape.

FIG. 4 is a diagram illustrating one example of a system 80 that includes a newer generation tape drive 82 that receives data from older generation tapes, such as older generation tape 64, and stores the received data into a newer generation tape 84. Newer generation tape drive 82 receives data at 86 via a host computer and host computer interface, such as host computer 28 and host computer interface 40, and/or newer generation tape drive 82 receives the data at 88 via a tape library, such as tape library 22. Also, newer generation tape drive 82 receives commands at 86 and/or 88 that configure it to receive migration data from older generation tapes.

Newer generation tape drive 82 includes migration software for migrating data from older generation tapes to a newer generation tape, such as newer generation tape 84. Newer generation tape drive 82 reads and writes newer generation tape 84 via communications channel 90, such as a read/write head. In one example, the older generation tapes are LTO tape cartridges. In one example, the newer generation tape 84 is an LTO tape cartridge having two or more partitions. In one example, the newer generation tape 84 is an LTO-5 or newer generation tape cartridge.

The older generation tape data is provided by a tape drive, such as older generation tape drive 62, that reads the older generation tape, including all of the user accessible data from the older generation tape and at least part of the non-user accessible data from the older generation tape, and provides the data to newer generation tape drive 82. In one example, the tape drive reads the older generation tape and provides the data to a tape library, such as tape library 22, which provides the data at 88 to newer generation tape drive 82. In one example, the tape drive reads the older generation tape and provides the data to migration appliance software in a computer system, such as host computer 28, which provides the data at 86 to newer generation tape drive 82.

The older generation tape data from each older generation tape includes user accessible data from the older generation tape and non-user accessible data from the older generation tape. User accessible data includes data from the magnetic tape of the older generation tape, which can be read and written by the user, such as by the native application. Non-user accessible data includes information stored in one or more of: a non-volatile memory chip in the older generation tape, barcode data from the older generation tape, and non-user accessible portions of the magnetic tape of the older generation tape. These non-user accessible portions of the magnetic tape of the older generation tape are accessible by only tape drive firmware and a few other devices. In one example, the non-user accessible data includes cartridge memory data, which is a superset of the SCSI standards medium attribute memory data, and in the older generation tape. In one example, a tape library, such as tape library 22, reads the barcode of the older generation tape and provides the barcode data to newer generation tape drive 82.

Non-user accessible data includes parametric data and data, sometimes referred to as metadata, which can be maintained for each and every record or logical block. Non-user accessible data includes information, such as whether data is encrypted or not encrypted with references to encryption keys. Also, non-user accessible data includes information, such as write pass count information that indicates the number of times the magnetic tape has been modified. Newer generation tape drive 82 receives the older generation tape data and writes a copy of this data into the newer generation tape 84. In one example, newer generation tape drive 82 writes an exact copy of this data into the newer generation tape 84.

In operation, the tape drive that reads the older generation tape and newer generation tape drive 82 receive commands via a tape library, such as tape library 22, and/or via a host computer, such as host computer 28. These commands configure them for migrating older generation tapes to newer generation tape 84. The tape drive that reads the older generation tape is configured to read the user accessible data from the older generation tape and to read the non-user accessible data from the older generation tape and provide the data to newer generation tape drive 82. Newer generation tape drive 82 includes migration software and receives commands that configure newer generation tape drive 82 and newer generation tape 84 for migrating older generation tapes to newer generation tape 84. Newer generation tape drive 82 is configured to copy the older generation tape data into one or more partitions in newer generation tape 84. In one example, newer generation tape drive 82 receives commands that put it into tape migration mode. In one example, newer generation tape drive 82 receives commands to partition newer generation tape 84 and newer generation tape drive 82 creates partitions in newer generation tape 84 for receiving data from older generation tapes.

After configuring newer generation tape drive 82 and newer generation tape 84, newer generation tape drive 82 receives older generation tape data from a first older generation tape and writes the received data to newer generation tape 84. The data from the first older generation tape includes first user accessible data from the first older generation tape and first non-user accessible data from the first older generation tape. In one example, newer generation tape drive 82 writes all of the first user accessible data and all of the first non-user accessible data into a first partition of newer generation tape 84. In one example, newer generation tape drive 82 writes at least part of the first user accessible data into a first partition of newer generation tape 84. In one example, newer generation tape drive 82 writes at least part of the first non-user accessible data into a first partition of newer generation tape 84. In one example, newer generation tape drive 82 writes at least part of the data into a memory chip 92 in newer generation tape 84. In one example, newer generation tape drive 82 writes first user accessible data into magnetic media in newer generation tape 84 and at least part of the first non-user accessible data into memory chip 92.

Newer generation tape drive 82 also receives data from a second older generation tape and writes the received data to newer generation tape 84. The data from the second older generation tape includes second user accessible data from the second older generation tape and second non-user accessible data from the second older generation tape. In one example, newer generation tape drive 82 writes all of the second user accessible data and all of the second non-user accessible data into a second partition of newer generation tape 84. In one example, newer generation tape drive 82 writes at least part of the second user accessible data into a second partition of newer generation tape 84. In one example, newer generation tape drive 82 writes at least part of the second non-user accessible data into a second partition of newer generation tape 84. In one example, newer generation tape drive 82 writes at least part of the data into memory chip 92. In one example, newer generation tape drive 82 writes the second user accessible data into magnetic media in newer generation tape 84 and at least part of the second non-user accessible data into memory chip 92. In one example, newer generation tape drive 82 writes at least part of the second user accessible data and/or at least part of the second non-user accessible data into the first partition of newer generation tape 84.

A new barcode 94 is created for newer generation tape 84. Barcode 94 identifies newer generation tape 84 as a multi-volume tape. In one example, the new barcode 94 is a single barcode having a code that identifies it as a multi-volume tape. In one example, the new barcode 94 is a compilation of the original barcodes read from the older generation tapes.

Figure 5:
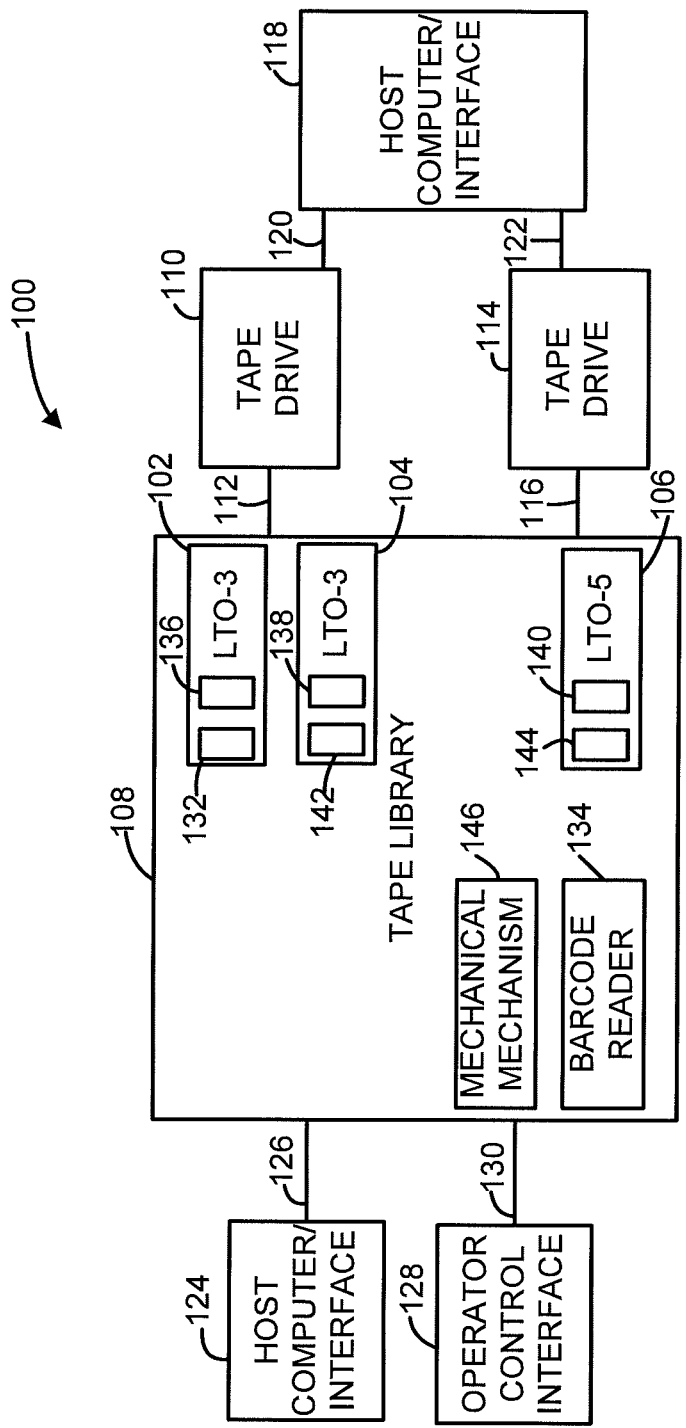
FIG. 5 is a diagram illustrating one example of a system that transfers LTO-3 tape cartridges to an LTO-5 tape cartridge.

FIG. 5 is a diagram illustrating one example of a system 100 that transfers first LTO-3 tape cartridge 102 and second LTO-3 tape cartridge 104 to LTO-5 tape cartridge 106. First LTO-3 tape cartridge 102 is transferred into a first partition of LTO-5 tape cartridge 106 and second LTO-3 tape cartridge 104 is transferred into a second partition of LTO-5 tape cartridge 106. After migration, system 100 identifies LTO-5 tape cartridge 106 as a multi-volume tape, i.e., a tape that includes migrated older generation tapes, and reports each of the migrated LTO-3 tape cartridges 102 and 104 as an independently selectable tape. If one of the migrated LTO-3 tape cartridges 102 and 104 is selected, system 100 provides access to the selected one of the migrated LTO-3 tape cartridges 102 and 104 via a native or original application, such as the application that created the selected one of the migrated LTO-3 tape cartridges 102 and 104.

System 100 includes a tape library 108 communicatively coupled to an LTO-3 tape drive 110 via communications channel 112 and communicatively coupled to an LTO-5 tape drive 114 via communications channel 116. LTO-3 tape drive 110 is communicatively coupled to host computer/interface 118 via communications channel 120, and LTO-5 tape drive 114 is communicatively coupled to host computer/interface 118 via communications channel 122. Also, tape library 108 is communicatively coupled to a host computer/interface 124 via communications channel 126 and to an operator control interface 128 via communications channel 130. In one example, host computer/interface 118 is communicatively coupled to host computer/interface 124. In one example, host computer/interface 118 and host computer/interface 124 are the same host computer/interface.

Tape library 108 contains first LTO-3 tape cartridge 102, second LTO-3 tape cartridge 104, and LTO-5 tape cartridge 106. Also, tape library 108 includes a mechanical mechanism 146 for inserting each of the first LTO-3 tape cartridge 102 and the second LTO-3 tape cartridge 104 into LTO-3 tape drive 110, and for inserting LTO-5 tape cartridge 106 into LTO-5 tape drive 114. LTO-3 tape drive 110 reads and writes first LTO-3 tape cartridge 102 and second LTO-3 tape cartridge 104 via read and write heads in LTO-3 tape drive 110. LTO-5 tape drive 114 reads and writes LTO-5 tape cartridge 106 via read and write heads in LTO-5 tape drive 114.

Tape library 108 reads the barcode 132 of first LTO-3 tape cartridge 102 via barcode reader 134 and loads first LTO-3 tape cartridge 102 into LTO-3 tape drive 110. Also, tape library 108 loads LTO-5 tape cartridge 106 into LTO-5 tape drive 114.

LTO-3 tape drive 110 receives commands via tape library 108 and/or host computer/interface 118 that configures LTO-3 tape drive 110 to migrate first LTO-3 tape cartridge 102 (and second LTO-3 tape cartridge 104) to LTO-5 tape cartridge 106. LTO-5 tape drive 114 receives commands via tape library 108 and/or host computer/interface 118 that configures LTO-5 tape drive 114 to store data from first LTO-3 tape cartridge 102 into a first partition and data from second LTO-3 tape cartridge 104 into a second partition of LTO-5 tape cartridge 106. In one example, LTO-5 tape drive 114 partitions LTO-5 tape cartridge 106 into a first partition and a second partition for receiving first LTO-3 tape cartridge 102 and second LTO-3 tape cartridge 104, respectively. In one example, host computer/interface 118 includes migration appliance software for migrating older generation tapes, such as LTO-3 tape cartridges 102 and 104, to a newer generation tape, such as LTO-5 tape cartridge 106.

LTO-3 tape drive 110 reads user accessible data and non-user accessible data from first LTO-3 tape cartridge 102 and provides the data to tape library 108 and/or host computer/interface 118. In one example, tape library 108 transfers the data from first LTO-3 tape cartridge 102, including barcode data from first LTO-3 tape cartridge 102, to LTO-5 tape drive 114. In one example, host computer/interface 118 transfers the data from first LTO-3 tape cartridge 102 to LTO-5 tape drive 114, and tape library 108 transfers the barcode data from first LTO-3 tape cartridge 102 to LTO-5 tape drive 114.

The data from each of the first LTO-3 tape cartridge 102 and the second LTO-3 tape cartridge 104 includes user accessible data from the older generation tape and non-user accessible data from the older generation tape. User accessible data includes data from the magnetic tape of the older generation tape, which can be read and written by the user, such as by the native application. Non-user accessible data includes information stored in one or more of: non-volatile memory chips 136 and 138 in the older generation tape, barcode data from the older generation tape, and non-user accessible portions of the magnetic tape of the older generation tape accessible by tape drive firmware and a few other devices.

LTO-5 tape drive 114 receives the data from first LTO-3 tape cartridge 102 and writes the received data to LTO-5 tape cartridge 106. The data from first LTO-3 tape cartridge 102 includes first user accessible data from first LTO-3 tape cartridge 102 and first non-user accessible data from first LTO-3 tape cartridge 102. LTO-5 tape drive 114 writes all of the first user accessible data and all of the first non-user accessible data into a first partition of LTO-5 tape cartridge 106. In another example, LTO-5 tape drive 114 writes at least part of the first user accessible data into a first partition of LTO-5 tape cartridge 106. In one example, LTO-5 tape drive 114 writes at least part of the first non-user accessible data into a first partition of LTO-5 tape cartridge 106. In one example, LTO-5 tape drive 114 writes at least part of the non-user accessible data from first LTO-3 tape cartridge 102 into a memory chip 140 in LTO-5 tape cartridge 106.

After migrating data from first LTO-3 tape cartridge 102, tape library 108 removes first LTO-3 tape cartridge 102 from LTO-3 tape drive 110. Tape library 108 reads the barcode 142 of second LTO-3 tape cartridge 104 and loads second LTO-3 tape cartridge 104 into LTO-3 tape drive 110. LTO-3 tape drive 110 reads user accessible data and non-user accessible data from second LTO-3 tape cartridge 104 and provides the data to tape library 108 and/or host computer/interface 118. In one example, tape library 108 transfers the data from second LTO-3 tape cartridge 104, including barcode data from second LTO-3 tape cartridge 104, to LTO-5 tape drive 114. In one example, host computer/interface 118 transfers the data from second LTO-3 tape cartridge 104 to LTO-5 tape drive 114, and tape library 108 transfers the barcode data from second LTO-3 tape cartridge 104 to LTO-5 tape drive 114.

LTO-5 tape drive 114 receives the data from second LTO-3 tape cartridge 104 and writes the received data to LTO-5 tape cartridge 106. The data from second LTO-3 tape cartridge 104 includes second user accessible data from second LTO-3 tape cartridge 104 and second non-user accessible data from second LTO-3 tape cartridge 104. LTO-5 tape drive 114 writes all of the second user accessible data and all of the second non-user accessible data into a second partition of LTO-5 tape cartridge 106. In another example, LTO-5 tape drive 114 writes at least part of the second user accessible data into a second partition of LTO-5 tape cartridge 106. In one example, LTO-5 tape drive 114 writes at least part of the second non-user accessible data into a second partition of LTO-5 tape cartridge 106. In one example, LTO-5 tape drive 114 writes at least part of the non-user accessible data from second LTO-3 tape cartridge 104 into memory chip 140 in LTO-5 tape cartridge 106.

Tape library 108 creates a new barcode 144 for LTO-5 tape cartridge 106. Barcode 144 identifies LTO-5 tape cartridge 106 as a multi-volume tape. The new barcode 144 is put on LTO-5 tape cartridge 106 and readable by tape library 108. In one example, the new barcode 144 is a single barcode having a code that identifies it as a multi-volume tape. In one example, the new barcode 144 is a compilation of the two original barcodes 132 and 144 read from first LTO-3 tape cartridge 102 and second LTO-3 tape cartridge 104. In another example, an external mechanism is activated to create barcode 144, which is applied via an automated process or by an operator.

In another example, first LTO-3 tape cartridge 102 and second LTO-3 tape cartridge 104 are migrated or transferred into the same partition, such as the first partition, in LTO-5 tape cartridge 106. LTO-5 tape drive 114 writes at least part of the data from first LTO-3 tape cartridge 102 and at least part of the data from second LTO-3 tape cartridge 104 into the first partition of LTO-5 tape cartridge 106. LTO-5 tape drive 114 uses delineators to separate the data from first LTO-3 tape cartridge 102 and the data from second LTO-3 tape cartridge 104. In one example, the delineators include a sequence of file marks. In one example, the delineators include special data blocks. In one example, the delineators include addressing stored in non-volatile memory, such as a memory chip in the tape cartridge or a non-user accessible region of the tape media.

A user accesses first LTO-3 tape cartridge 102 and second LTO-3 tape cartridge 104 in LTO-5 tape cartridge 106 via tape library 108 and at least one of host computer/interface 124 and host computer/interface 118. Tape library 108 reads the barcode 144 on LTO-5 tape cartridge 106 and identifies LTO-5 tape cartridge 106 as a multi-volume tape. Tape library 108 determines that first LTO-3 tape cartridge 102 and second LTO-3 tape cartridge 104 are in LTO-5 tape cartridge 106 and displays the original barcode 132 for first LTO-3 tape cartridge 102 and the original barcode 142 for second LTO-3 tape cartridge 104 on host computer/interfaces 118 and 124 and operator control interface 128. Each of the first LTO-3 tape cartridge 102 and the second LTO-3 tape cartridge 104 is independently selectable over host computer/interfaces 118 and 124 and operator control interface 128.

Tape library 108 includes barcode reader or scanner 134 that reads barcode 144 on LTO-5 tape cartridge 106. Tape library 108 identifies LTO-5 tape cartridge 106 as a multi-volume tape via the barcode 144. In one example, tape library 108 determines that first LTO-3 tape cartridge 102 and second LTO-3 tape cartridge 104 are in LTO-5 tape cartridge 106 via barcode 144, where barcode 144 is a compilation of the original barcode 132 of first LTO-3 tape cartridge 102 and the original barcode 142 of second LTO-3 tape cartridge 104. In one example, tape library 108 determines that first LTO-3 tape cartridge 102 and second LTO-3 tape cartridge 104 are in LTO-5 tape cartridge 106 by loading LTO-5 tape cartridge 106 into LTO-5 tape drive 114, where LTO-5 tape drive 114 reads LTO-5 tape cartridge 106 and determines that first LTO-3 tape cartridge 102 and second LTO-3 tape cartridge 104 are in LTO-5 tape cartridge 106 and reports this information back to tape library 108. In one example, tape library 108 loads LTO-5 tape cartridge 106 into LTO-5 tape drive 114, where LTO-5 tape drive 114 reads LTO-5 tape cartridge 106 and the original barcodes 132 and 144 for each of first LTO-3 tape cartridge 102 and second LTO-3 tape cartridge 104 and reports this information back to tape library 108.

In another example, tape library 108 includes an RFID tag reader that reads an RFID tag on LTO-5 tape cartridge 106. In one example, the RFID tag includes information that LTO-5 tape cartridge 106 is a multi-volume tape and the RFID reader reports this information back to tape library 108. In one example, the RFID tag includes the original barcodes 132 and 144 for each of first LTO-3 tape cartridge 102 and second LTO-3 tape cartridge 104 and the RFID reader reports the original barcodes 132 and 144 back to tape library 108.

A user requests or selects one of first LTO-3 tape cartridge 102 and second LTO-3 tape cartridge 104. Tape library 108 receives the selection and loads LTO-5 tape cartridge 106 into LTO-5 tape drive 114. Tape library 108 indicates to LTO-5 tape drive 114 that it is loading a multi-volume tape and the selected one of the first LTO-3 tape cartridge 102 and the second LTO-3 tape cartridge 104. LTO-5 tape drive 114 reads LTO-5 tape cartridge 106 and determines which partition in LTO-5 tape cartridge 106 includes the selected one of the first LTO-3 tape cartridge 102 and the second LTO-3 tape cartridge 104. LTO-5 tape drive 114 positions LTO-5 tape cartridge 106 to the identified partition to access the selected one of the first LTO-3 tape cartridge 102 and the second LTO-3 tape cartridge 104 and provides an indication that the selected one of the first LTO-3 tape cartridge 102 and the second LTO-3 tape cartridge 104 is available for access by an application, including a native or original application. In one example, LTO-5 tape drive 114 scans non-user accessible data in LTO-5 tape cartridge 106 to determine which partition in LTO-5 tape cartridge 106 includes the selected one of the first LTO-3 tape cartridge 102 and the second LTO-3 tape cartridge 104. In one example, LTO-5 tape drive 114 indicates that it is an LTO-3 tape drive and/or that LTO-5 tape cartridge 106 is an LTO-3 tape. In one example, LTO-5 tape drive 114 indicates that the selected one of the first LTO-3 tape cartridge 102 and second LTO-3 tape cartridge 104 is in LTO-5 tape cartridge 106 and hides the existence of the not selected one of the first LTO-3 tape cartridge 102 and second LTO-3 tape cartridge 104, only allowing access to the selected one of the first LTO-3 tape cartridge 102 and second LTO-3 tape cartridge 104.

In system 100, users have access to each of the first LTO-3 tape cartridge 102 and the second LTO-3 tape cartridge 104, as if they were original LTO-3 tape cartridges loaded into an original LTO-3 tape drive. Users can use original applications to access each of the first LTO-3 tape cartridge 102 and the second LTO-3 tape cartridge 104 without changing the original application. The original application looks for an LTO-3 tape cartridge and virtually finds it in the LTO-5 tape cartridge 106.

Figure 6:
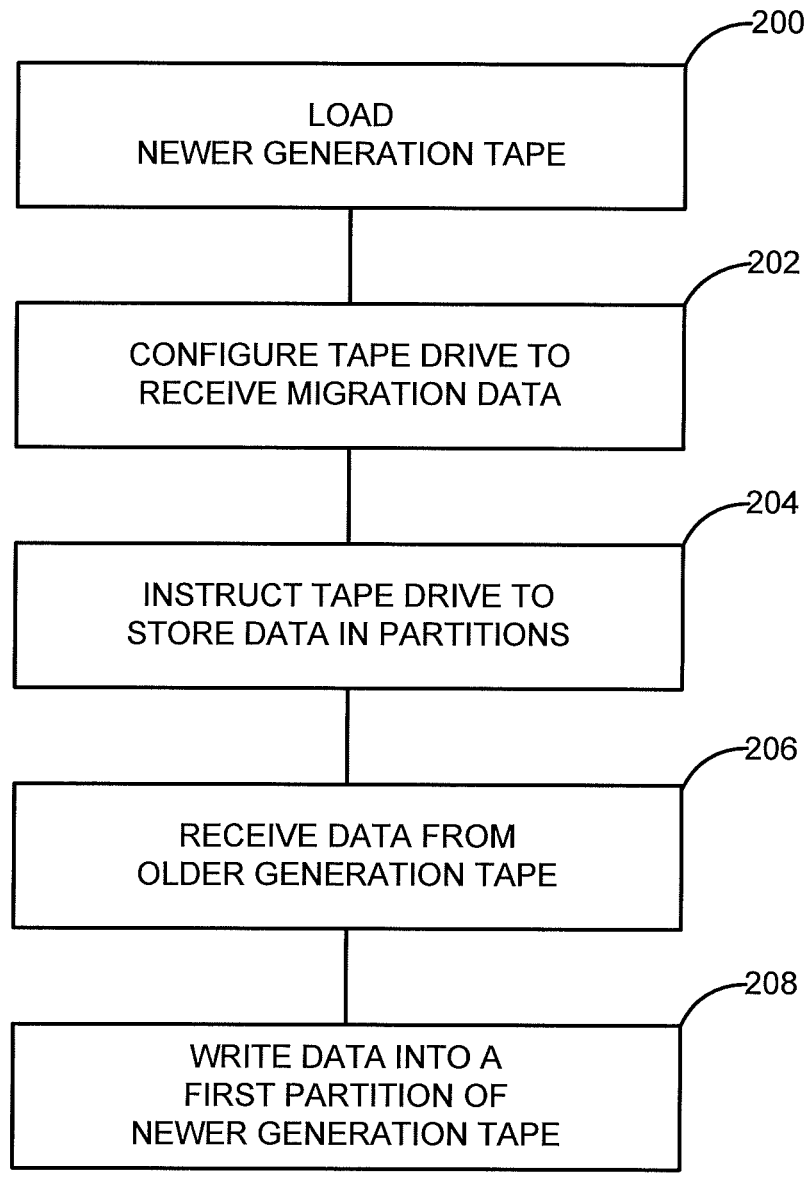
FIG. 6 is a diagram illustrating one example of a method of media migration.

FIG. 6 is a diagram illustrating one example of a method of media migration. A tape drive, such as one of the tape drives 24a-24n (shown in FIG. 1), receives data from older generation tapes and stores the received data into a newer generation tape. In one example, the older generation tapes are LTO tape cartridges. In one example, the newer generation tape is an LTO tape cartridge having two or more partitions. In one example, the newer generation tape is an LTO-5 or newer generation tape cartridge.

At 200, a tape library, such as tape library 22, loads the newer generation tape into a tape drive, such as tape drive 24a. At 202, the tape drive receives commands that configure the tape drive to receive migration data from older generation tapes. This migration data includes user accessible data and non-user accessible data to be stored in the newer generation tape. At 204, the tape drive receives commands that instruct the tape drive to store at least part of the data from the older generation tapes into partitions in the newer generation tape. In one example, the tape drive is set to store at least part of the data from one older generation tape into a corresponding partition in the newer generation tape, with data from each older generation tape stored in a different corresponding partition of the newer generation tape. In one example, the tape drive receives commands from the tape library and a host computer and host computer interface, such as host computer 32 and host computer interface 44. In one example, the tape drive receives commands directly from a host computer and host computer interface, such as host computer 28 and host computer interface 40.

At 206, the tape drive receives data, which includes user accessible data and non-user accessible data, from a first older generation tape. At 208, the tape drive writes at least part of the received data into a first partition in the newer generation tape. In one example, the tape drive writes all of the user accessible data and all of the non-user accessible data from the first older generation tape into the first partition of the newer generation tape. In one example, the tape drive writes at least part of the user accessible data from the first older generation tape into the first partition of the newer generation tape. In one example, the tape drive writes at least part of the non-user accessible data from the first older generation tape into the first partition of the newer generation tape. In one example, the tape drive writes at least part of the data from the first older generation tape into a memory chip in the newer generation tape.

Figure 7:
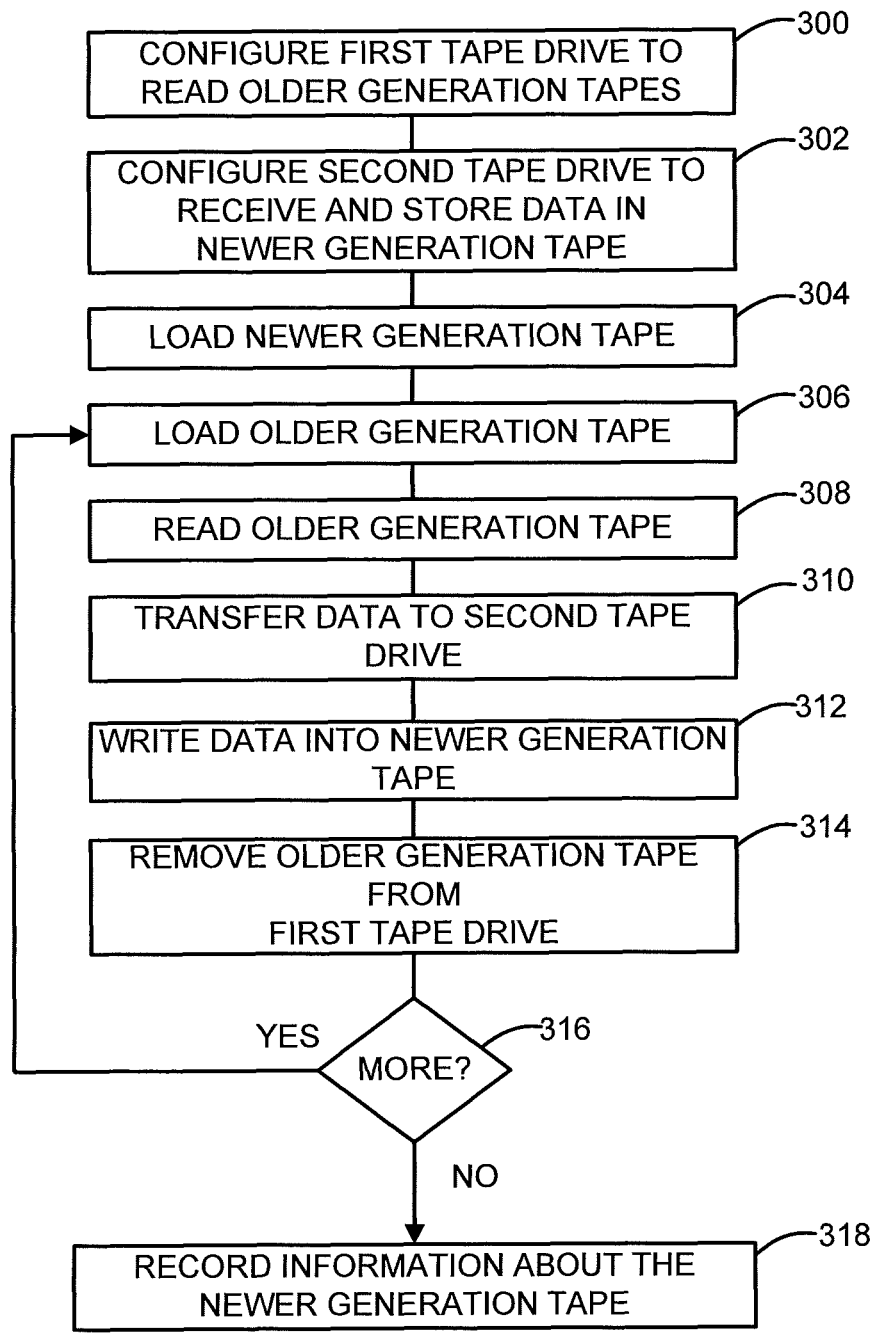
FIG. 7 is a diagram illustrating one example of a method of migrating data from older generation tapes to a newer generation tape.

FIG. 7 is a diagram illustrating one example of a method of migrating data from older generation tapes to a newer generation tape. At 300, a first tape drive, such as LTO-3 tape drive 110 (shown in FIG. 5), receives commands that configure the first tape drive for migrating data, including user accessible data and non-user accessible data, from older generation tapes to a newer generation tape. The first tape drive is configured to read non-user accessible data including non-user accessible data from one or more of a memory chip and non-user accessible data from a portion of the magnetic tape in the older generation tape. In one example, the first tape drive receives commands from a tape library, such as tape library 108, and a host computer/interface, such as host computer/interface 124. In one example, the first tape drive receives commands directly from a host computer/interface, such as host computer/interface 118.

At 302, a second tape drive, such as LTO-5 tape drive 114, receives commands that configure the second tape drive for receiving and storing data, including user accessible data and non-user accessible data, from older generation tapes to a newer generation tape and into partitions in the newer generation tape. The second tape drive is configured to receive and store non-user accessible data from the older generation tape including non-user accessible data from one or more of a memory chip, non-user accessible data from a portion of the magnetic tape in the older generation tape, and barcode data from the older generation tape. In one example, a host computer system, such as host computer/interface 118, includes migration software connected to the first and second tape drives for configuring the first and second tape drives to migrate older generation tapes to a newer generation tape. In one example, a tape library, such as tape library 108, and a host computer system, such as host computer/interface 124, include migration software connected to the first and second tape drives for configuring the first and second tape drives to migrate older generation tapes to a newer generation tape. In one example, the second tape drive is configured to store at least part of the data from one older generation tape into a corresponding partition in the newer generation tape, with each older generation tape stored in a different corresponding partition of the newer generation tape. In one example, the second tape drive creates partitions in the newer generation tape for receiving the data from the older generation tapes.

At 304, the tape library loads the newer generation tape into the second tape drive, and at 306, the tape library reads the barcode of an older generation tape and loads the older generation tape into the first tape drive.

At 308, the first tape drive reads user accessible data and non-user accessible data from the older generation tape and provides the data to the tape library and/or a host computer/interface, such as host computer/interface 118. At 310, the tape library and/or the host computer/interface transfers the data to the second tape. In one example, the tape library transfers the barcode data from the older generation tape to the second tape drive.

At 312, the second tape drive receives the data from the older generation tape and writes the received data into the newer generation tape, where the data from the older generation tape includes user accessible data and non-user accessible data from the older generation tape. The second tape drive writes at least part of the user accessible data and/or at least part of the non-user accessible data into a first partition of the newer generation tape. In one example, the second tape drive writes at least part of the data from the older generation tape into a memory chip in the newer generation tape. In one example, the second tape drive writes non-user accessible data including one or more of: at least part of the data from a memory chip of the older generation tape, at least part of the non-user accessible data from a portion of magnetic tape in the older generation tape, and the barcode from the older generation tape.

At 314, the tape library removes the older generation tape from the first tape drive and, at 316, the tape library determines if there is another older generation tape to migrate to the newer generation tape.

If there is, the process repeats itself from 306, where the tape library reads the barcode of the next older generation tape and loads it into the first tape drive. At 308, the first tape drive reads user accessible data and non-user accessible data from the next older generation tape and provides the data to the tape library and a host computer/interface. At 310, the data, including the barcode data from the older generation tape, is transferred to the second tape drive.

At 312, the second tape drive receives the data from the next older generation tape and writes the received data into the newer generation tape, where the data from the next older generation tape includes user accessible data and non-user accessible data from the next older generation tape. The second tape drive writes at least part of the user accessible data and/or at least part of the non-user accessible data into a second or the next partition of the newer generation tape. In one example, the second tape drive writes at least part of the data from the next older generation tape into a memory chip in the newer generation tape.

At 314, the tape library removes the next older generation tape from the first tape drive and, at 316, the tape library determines if there is another older generation tape to migrate to the newer generation tape. If there is, the process repeats itself from 306. If there is not, the process continues at 318 where multi-volume information is recorded about the newer generation tape.

In one example, the tape library or an external mechanism creates a new barcode for the newer generation tape, which identifies the newer generation tape as a multi-volume tape. In one example, the new barcode is a single barcode having a code that identifies it as a multi-volume tape. In one example, the new barcode is a compilation of the original barcodes from the migrated older generation tapes. In one example, multi-volume information is written to an RFID.

Figure 8:
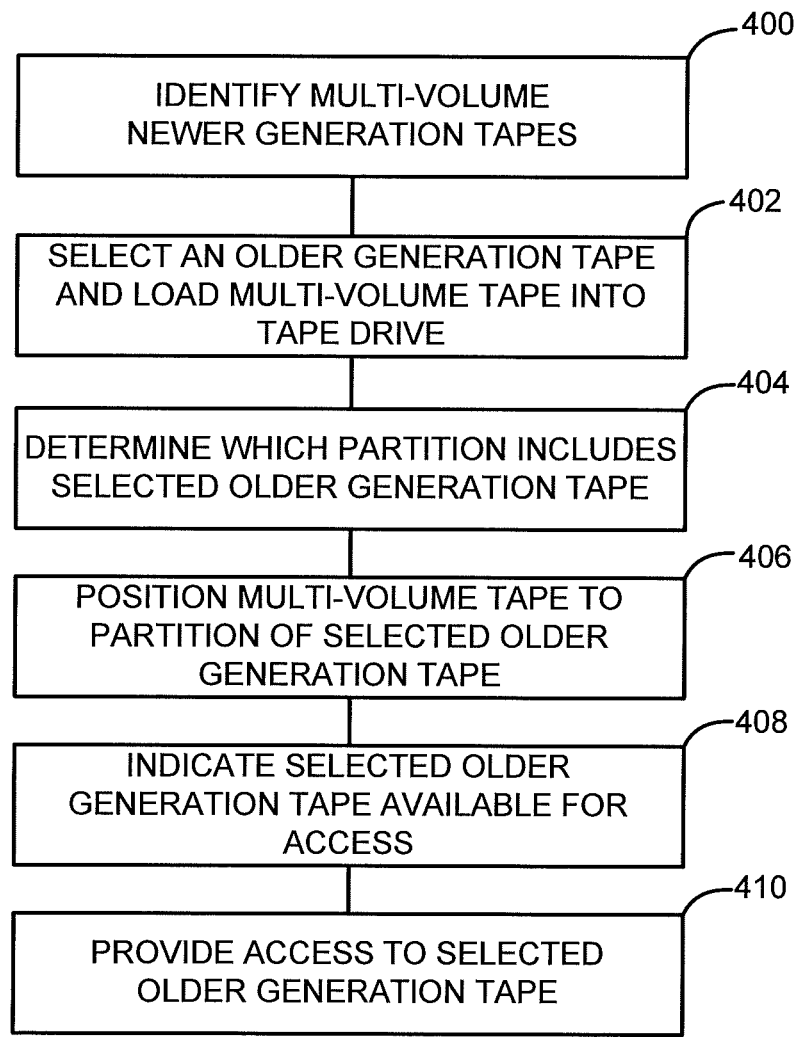
FIG. 8 is a diagram illustrating one example of a method of accessing migrated older generation tapes in a newer generation tape.

FIG. 8 is a diagram illustrating one example of a method of accessing migrated older generation tapes in a newer generation tape. At 400, a tape library, such as tape library 22 (shown in FIG. 1), identifies newer generation tapes that include one or more migrated older generation tapes. Each of the newer generation tapes that includes one or more migrated older generation tapes has a barcode that identifies the tape as a multi-volume tape, i.e., a newer generation tape that includes one or more migrated older generation tapes. The tape library includes a barcode reader or scanner that reads the barcode on each of the newer generation tapes and the tape library identifies multi-volume newer generation tapes via the barcode. In another example, the tape library loads one of the newer generation tapes into a tape drive, such as tape drive 24*a*, which reads the loaded tape and reports back to the tape library whether the loaded tape is a multi-volume tape.

At 402, a user requests or selects one of the migrated older generation tapes in the multi-volume tape and the tape library loads the multi-volume tape that includes the selected migrated older generation tape into a tape drive, such as tape drive 24a. The tape library indicates to the tape drive that it is loading a multi-volume tape and the tape library indicates the selected migrated older generation tape to the tape drive.

At 404, the tape drive reads the multi-volume tape and determines which partition in the multi-volume tape includes the selected migrated older generation tape. At 406, the tape drive positions the multi-volume tape to the partition to access the selected migrated older generation tape. At 408, the tape drive provides an indication that the selected migrated older generation tape is available for access by the original application. In one example, the tape drive scans non-user accessible data in the multi-volume tape to determine which partition in the multi-volume tape includes the selected migrated older generation tape.

At 410, the tape drive provides access to the selected one of the one or more migrated tapes by an original application for the selected one of the one or more migrated tapes. In one example, the tape drive indicates that it is a different generation tape drive and the multi-volume tape is a different generation tape ready for access by the original application. In one example, the tape drive indicates that the generation of the tape drive and the generation of the tape is the same as the generation of the selected migrated older generation tape.

Figure 9:
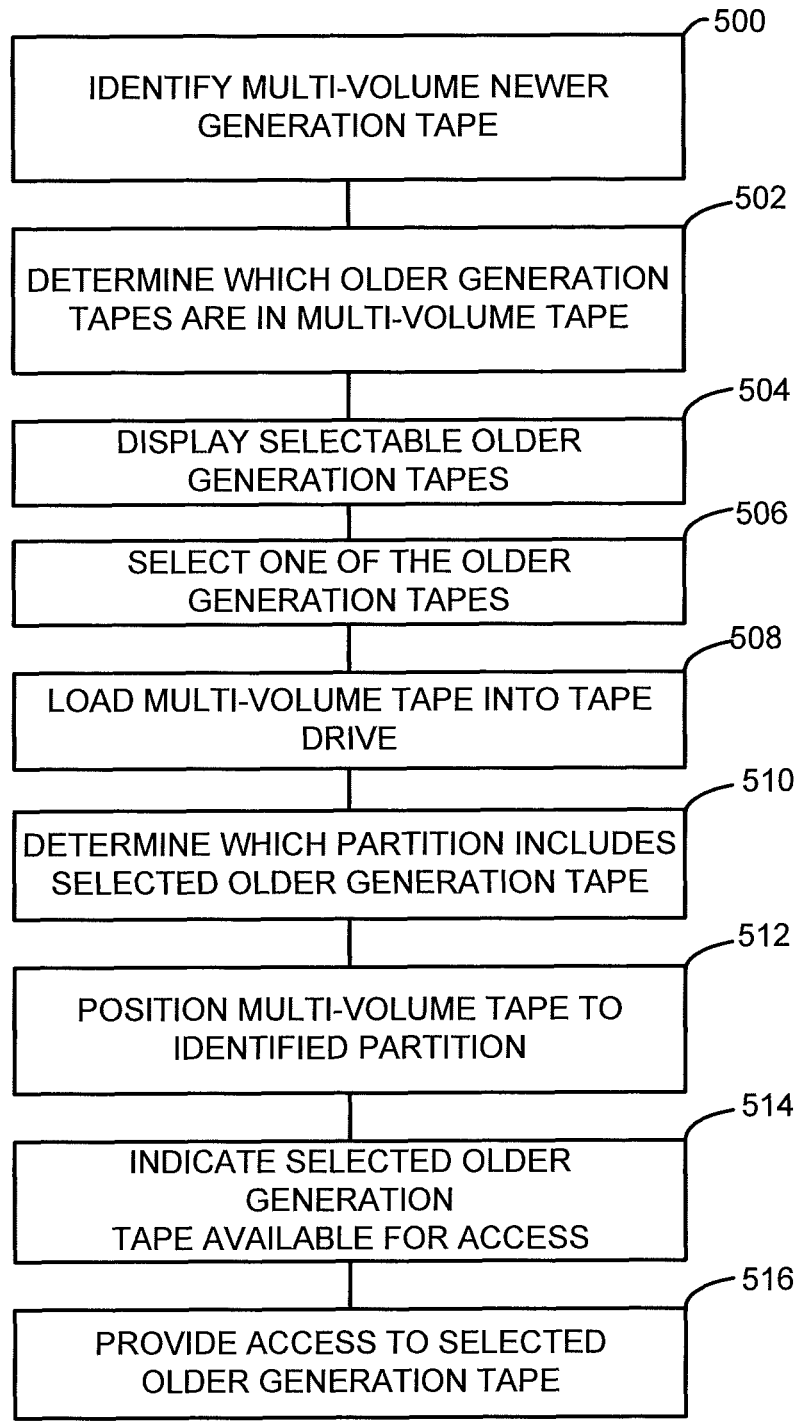
FIG. 9 is a diagram illustrating another example of a method of accessing migrated older generation tapes in a newer generation tape.

FIG. 9 is a diagram illustrating another example of accessing migrated older generation tapes in a newer generation tape. At 500, a tape library, such as tape library 108 (shown in FIG. 5), reads the barcode on a newer generation tape and identifies the newer generation tape as a multi-volume tape. The tape library includes a barcode reader or scanner that reads the barcode on the newer generation tape, which identifies the newer generation tape as a multi-volume tape.

At 502, the tape library determines which older generation tapes are in the newer generation tape. In one example, the tape library determines that the older generation tapes are in the newer generation tape via the barcode, such as by reading a barcode that is a compilation of the original barcodes of the older generation tapes. In one example, the tape library determines which older generation tapes are in the newer generation tape by loading the newer generation tape into a tape drive that reads the newer generation tape and reports back to the tape library which older generation tapes are in the newer generation tape.

At 504, a host computer/interface, such as host computer/interface 118 or operator control interface 128, displays the original barcode for each of the older generation tapes, where each of the older generation tapes is independently selectable over the interface. At 506, a user requests or selects one of the older generation tapes.

At 508, the tape library receives the selection and loads the newer generation tape into a tape drive, such as LTO-5 tape drive 114. The tape library indicates to the tape drive that it is loading a multi-volume tape and the selected one of the older generation tapes.

At 510, the tape drive reads the newer generation tape and determines which partition in the newer generation tape includes the selected one of the older generation tapes. In one example, the tape drive scans non-user accessible data in the newer generation tape to determine which partition in the newer generation tape includes the selected one of the older generation tapes.

At 512, the tape drive positions the newer generation tape to the identified partition to access the selected one of the older generation tapes. At 514, the tape drive provides an indication that the selected one of the older generation tapes is available for access by an application, including a native or original application. At 516, the tape drive provides access to the selected one of the one or more migrated tapes by an original application for the selected one of the one or more migrated tapes. In one example, the tape drive indicates that it and the newer generation tape are the same generation as the selected one of the older generation tapes.

Although specific embodiments have been illustrated and described herein, it will be appreciated by those of ordinary skill in the art that a variety of alternate and/or equivalent implementations may be substituted for the specific embodiments shown and described without departing from the scope of the present techniques. This application is intended to cover any adaptations or variations of the specific embodiments discussed herein. It is to be understood that features of the various embodiments described herein may be combined with each other, unless specifically noted otherwise.

What is claimed is:

1. A system comprising:
   a tape library to identify which tapes in the tape library include one or more migrated tapes, determine which partition in one of the tapes includes a selected one of the one or more migrated tapes, position the one of the tapes to the partition to access the selected one of the one or more migrated tapes, and provide an indication that the selected one of the one or more migrated tapes is available for access; and
   a tape drive to provide access to the selected one of the one or more migrated tapes by an original application for the selected one of the one or more migrated tapes.

2. The system of claim 1, wherein each of the tapes includes a barcode and the tape library identifies which of the tapes include the one or more migrated tapes by reading the barcode.

3. The system of claim 1, wherein the system indicates an original barcode for each of the one or more migrated tapes.

4. The system of claim 1, wherein the tape drive is to read at least one of the tapes and provide an original barcode for each of the one or more migrated tapes in the at least one of the tapes.

5. The system of claim 1, wherein the system is to indicate each of the one or more migrated tapes is an independently selectable tape and the tape library is configured to load one of the tapes that includes a selected one of the one or more migrated tapes into the tape drive.

6. The system of claim 5, wherein the tape drive is to determine a location in the one of the tapes that includes the selected one of the one or more migrated tapes, position the one of the tapes to the location to access the selected one of the one or more migrated tapes, and provide an indication that the selected one of the one or more migrated tapes is available for access by the original application.

7. The system of claim 6, wherein the tape drive is to scan non-user accessible data in the one of the tapes to determine the location in the one of the tapes that includes the selected one of the one or more migrated tapes.

8. The system of claim 5, wherein the tape drive is to indicate that the one of the tapes is a different generation tape for access by the original application.

9. A system comprising:
   a first tape drive to receive first data from a first tape in a tape library and write the first data to a first location in a second tape in the tape library, wherein the first data includes at least one of first user accessible data from the first tape and first non-user accessible data from the first tape, the first tape drive to provide access to a selected one of one or more migrated tapes by an original application for the selected one of the one or more migrated tapes in response to the tape library identifying which tapes in the tape library include the one or more migrated tapes, determining which partition in one of the tapes includes the selected one of the one or more migrated tapes, positioning the one of the tapes to the partition to access the selected one of the one or more migrated tapes, and providing an indication that the selected one of the one or more migrated tapes is available for access.

10. The system of claim 9, wherein the first tape drive is to receive second data from a third tape and write the second data to at least one of the first location and a second location in the second tape, wherein the second data includes at least one of second user accessible data from the third tape and second non-user accessible data from the third tape.

11. The system of claim 9, wherein a second tape drive is to read the first tape including at least part of the first non-user accessible data and provide the at least part of the first non-user accessible data to the first tape drive.

12. The system of claim 9, wherein the first non-user accessible data includes at least one of:
   non-user accessible data from a non-magnetic tape storage device in the first tape;
   non-user accessible data from a portion of magnetic tape in the first tape; and
   barcode data from the first tape.

13. The system of claim 9, comprising a tape library to read a barcode of the first tape and provide the barcode to the first tape drive.

14. A method comprising:
   detecting which tapes in a tape library include one or more migrated tapes;
   determining which partition in one of the tapes includes a selected one of the one or more migrated tapes;
   positioning the one of the tapes to the partition to access the selected one of the one or more migrated tapes;
   providing an indication that the selected one of the one or more migrated tapes is available for access; and
   providing access to the selected one of the one or more migrated tapes by an original application for the selected one of the one or more migrated tapes.

15. The method of claim 14 comprising:
   loading a first tape into a first tape drive;
   setting the first tape drive to receive migration data;
   setting the first tape drive to store at least part of the migration data in at least one partition in the first tape;
   receiving first migration data including first user accessible data and first non-user accessible data from a second tape; and
   storing at least part of the first migration data in a first partition of the first tape.

16. The method of claim 15, comprising:
   receiving second migration data including second user accessible data and second non-user accessible data from a third tape; and
   storing at least part of the second migration data in one of the first partition and a second partition of the first tape.

17. The method of claim 15, comprising:
   loading the second tape into a second tape drive;
   setting the second tape drive to read at least part of the first non-user accessible data from the second tape; and
   providing the at least part of the first non-user accessible data to the first tape drive.

18. The method of claim 15, comprising one or more of:
   storing at least part of memory chip data from the second tape in the first tape;
   storing at least part of the first non-user accessible data from a portion of magnetic tape in the second tape in the first tape; and
   storing a barcode from the second tape in the first tape.

19. The method of claim 14, comprising:
   indicating an original barcode for each of the one or more migrated tapes;
   indicating that each of the one or more migrated tapes is an independently selectable tape; and
   loading the one of the tapes that includes the selected one of the one or more migrated tapes into a tape drive.

20. The method of claim 14, wherein determining which partition comprises: scanning non-user accessible data in the one of the tapes.

* * * * *